United States Patent
Consolacion et al.

(10) Patent No.: US 11,590,898 B2
(45) Date of Patent: Feb. 28, 2023

(54) SMART VAULT WITH SECURITY SYSTEM AFFIX TO REAR OR FRONT OF LICENSE PLATE LOCATION OUTSIDE ANY VEHICLE TO ENABLE REMOTE ACCESS TO CARS

(71) Applicant: Biig Technologies Inc., Burlingame, CA (US)

(72) Inventors: Charlene Consolacion, Tracy, CA (US); Janno Stern, Tallinn (EE); Jaan Viru, Tallinn (EE)

(73) Assignee: Biig Technologies Inc., Burlingame, CA (US)

( * ) Notice: Subject to any disclaimer, the term of this patent is extended or adjusted under 35 U.S.C. 154(b) by 466 days.

(21) Appl. No.: 16/716,407

(22) Filed: Dec. 16, 2019

(65) Prior Publication Data

US 2020/0189476 A1    Jun. 18, 2020

Related U.S. Application Data

(60) Provisional application No. 62/780,260, filed on Dec. 16, 2018.

(51) Int. Cl.
*B60R 7/02* (2006.01)
*G07C 9/00* (2020.01)
(Continued)

(52) U.S. Cl.
CPC ............. *B60R 7/02* (2013.01); *G07C 5/008* (2013.01); *G07C 5/02* (2013.01); *G07C 9/00309* (2013.01); *H04W 4/029* (2018.02); *H04W 4/80* (2018.02)

(58) Field of Classification Search
CPC .......... B60R 7/02; B60R 13/10; G07C 5/008; G07C 5/02; G07C 9/00309;
(Continued)

(56) References Cited

U.S. PATENT DOCUMENTS 2,218,679 A * 10/1940 Hubbell ................. C04B 28/32
106/685
4,182,062 A     1/1980 Krokos et al.
(Continued)

FOREIGN PATENT DOCUMENTS

CN         2254418 Y      5/1997

OTHER PUBLICATIONS

International Search Report, dated Feb. 24, 2020, for corresponding International Application No. PCT/US2019/066663 (2 pages).
(Continued)

*Primary Examiner* — Peter D Nolan
*Assistant Examiner* — Ashley L Redhead, Jr.
(74) *Attorney, Agent, or Firm* — Nutter McClennen & Fish LLP

(57) ABSTRACT

A smart license plate vault securely holds small objects, such as a vehicle key, while resembling a license plate mounting platform. The smart license plate vault may be operated by authorized third parties via a keypad located on the smart license plate vault to accept access codes and other information. The smart license plate vault may include a storage compartment with a removable cover for providing access to the storage compartment and an electronic locking mechanism for locking and unlocking the vault, a vault cover plate sensor for detecting when the vault cover plate has been placed into a closed position, a storage compartment sensor for recording information regarding an interior of the storage compartment when the vault cover plate sensor detects that the vault cover plate has been placed into the closed position, and a transmitter for wirelessly transmitting the recorded information to a remote location.

20 Claims, 4 Drawing Sheets

(51) Int. Cl.
*H04W 4/029* (2018.01)
*H04W 4/80* (2018.01)
*G07C 5/02* (2006.01)
*G07C 5/00* (2006.01)

(58) Field of Classification Search
CPC ...... G07C 9/00571; G07C 2009/00634; G07C 2209/62; G07C 9/00912; H04W 4/029; H04W 4/80; H04W 4/44; H04L 67/12; H04L 67/125
See application file for complete search history.

(56) References Cited

U.S. PATENT DOCUMENTS

| | | | |
|---|---|---|---|
| 5,778,805 A | 7/1998 | Green | |
| 5,979,339 A | 11/1999 | Smith | |
| 6,067,007 A * | 5/2000 | Gioia | B60R 25/33 307/10.3 |
| 6,401,466 B1 * | 6/2002 | Olsen | F25D 29/00 62/131 |
| 7,866,071 B1 | 1/2011 | Downey | |
| 8,768,565 B2 | 7/2014 | Jefferies et al. | |
| 10,308,218 B2 | 6/2019 | Golduber | |
| 10,981,541 B2 | 4/2021 | Golduber | |
| 2006/0261931 A1 * | 11/2006 | Cheng | G06V 40/45 340/5.53 |
| 2007/0001826 A1 * | 1/2007 | Lanier | G07C 9/28 340/425.5 |
| 2008/0196637 A1 | 8/2008 | Howell et al. | |
| 2011/0060480 A1 | 3/2011 | Mottla et al. | |
| 2011/0130134 A1 | 6/2011 | Rysselberghe | |
| 2011/0191126 A1 | 8/2011 | Hampshire et al. | |
| 2018/0154867 A1 * | 6/2018 | Golduber | B60R 25/24 |

OTHER PUBLICATIONS

Written Opinion of the International Searching Authority, dated Feb. 24, 2020, for corresponding International Application No. PCT/US2019/066663 (8 pages).

International Preliminary Report on Patentability, dated Jul. 1, 2021, for corresponding International Application No. PCT/2019/066663 (10 pages).

* cited by examiner

SMART VAULT WITH SECURITY SYSTEM AFFIX TO REAR OR FRONT OF LICENSE PLATE LOCATION OUTSIDE ANY VEHICLE TO ENABLE REMOTE ACCESS TO CARS

CROSS REFERENCE TO RELATED APPLICATION

The present application claims priority to provisional application No. 62/780,260 entitled "SMART VAULT WITH SECURITY SYSTEM AFFIX TO REAR OR FRONT OF LICENSE PLATE LOCATION OUTSIDE ANY VEHICLE TO ENABLE REMOTE ACCESS TO CARS." filed on Dec. 16, 2018, which is assigned to the assignee hereof and expressly incorporated by reference herein.

BACKGROUND

II. Field of Use

The present application relates to the automotive industry. More specifically, the present application relates to a method, apparatus and system for allowing remote access to vehicles.

III. Description of the Related Art

The automotive, retail, car rental and logistic industries have evolved to provide a variety of services to vehicle owners, such as in-trunk delivery of packages, groceries and other items, fuel delivery, car renting, and roadside assistance, among others.

One way to provide for such services is to hide a vehicle's key somewhere outside the vehicle so that an authorized person may access the vehicle. For example, a car key may be "hidden" by placing it on top of one of the car's tires, which is generally out of sight of people walking by but, of course, vulnerable to anyone nefariously looking for such a key, knowing that people sometimes use this method for purposes of car exchange.

Another way that has been used to store keys outside a vehicle is to use a magnetic 'vault". Such vaults typically comprise a container for holding a key and a strong magnet that allows placement in more inconspicuous areas of a vehicle, such as inside a wheel well or underneath a bumper. However, these vaults are still relatively easy to find by unauthorized persons.

In order to make a vault less accessible to unauthorized persons, some car manufacturers offer a vault that is pertinently affixed inside vehicles, such as under the hood, and electronically controlled via a wired connection to the vehicle, such as via an industry-standard OBDII connector. However, this method of key concealment is expensive and not available to vehicles that are not already equipped with such a device from the manufacturer.

More recently, vaults have been designed for placement behind license plates. For example, U.S. Pat. No. 7,866,071 describes a primitive "lock box" with a weather-proof compartment and a license plate holder that mounts to a license plate bracket. The license plate holder is pivotally connected to a "rigid panel" mounted to a license plate bracket, that exposes a vault and mechanical lock. A mechanical key operates the lock to allow access to the vault, where a key may be stored. However, in order to allow third party access to the vehicle, the mechanical key must be physically exchanged somehow with the third party, or a duplicate key must be provided. Having to exchange physical keys is a major drawback of this kind of vault.

It would be desirable, therefore, to overcome the shortcomings of the prior art to allow key concealment without the hassle of physical key exchange, and a solution that is affordable. It would be further desirable to provide additional functionality to such a key vault.

SUMMARY

The embodiments described herein relate to a smart license plate vault. In one embodiment, a smart license plate vault comprises a base portion sized and shaped as a vehicle license plate holder for installation onto a vehicle bumper, the base portion comprising a vault for storing small objects, comprising a storage compartment and a removable cover for providing access to the storage compartment, and an electronic locking mechanism for locking and unlocking the vault, and a movable portion rotatably coupled to an edge of the base portion, comprising means to secure a vehicle license plate.

BRIEF DESCRIPTION OF THE DRAWINGS

The features, advantages, and objects of the embodiments of the present invention will become more apparent from the detailed description as set forth below, when taken in conjunction with the drawings in which like referenced characters identify correspondingly throughout, and wherein.

DETAILED DESCRIPTION

The embodiments described herein relate to a universal smart license plate vault that is mounted between a vehicle bumper and a vehicle license plate. The smart license plate vault can be mounted to virtually any vehicle make or model. A movable portion of the smart license plate vault secures the vehicle license plate, and this movable portion is connected to a base portion of the smart license plate vault via a hinge. To access a storage compartment in the base portion, the movable portion is rotated away from the base portion, exposing the lockable compartment and, in one embodiment, a user interface in the form of a keypad that allows access to the lockable compartment. The smart license plate vault can be used to securely store a vehicle key, and/or other items, for access to the vehicle by authorized persons. For example, a vehicle key can be locked inside the vault, and the vault opened using a predetermined access code provided by a vehicle owner to an authorized person. The authorized person could be a delivery driver in the case of a delivery service that delivers packages or other items to an unattended, locked vehicle. The delivery driver can access an interior area or a trunk of the vehicle after retrieving the vehicle key from the vault. Applications for the embodiments described herein include the aforementioned package delivery services, car rental services, roadside assistance, etc.

Figure 1:
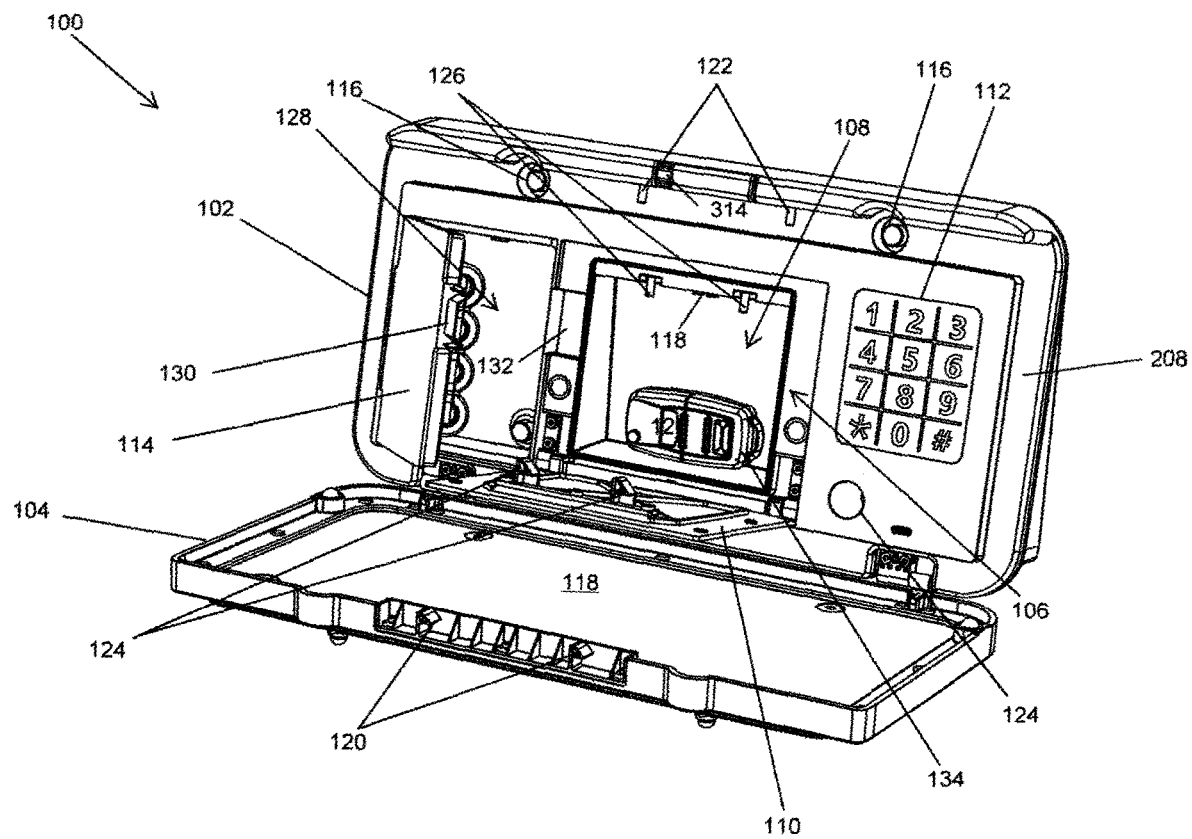
FIG. 1 shows a perspective view of one embodiment of a smart license plate vault in an open position.

FIG. 1 shows a perspective view of one embodiment of a smart license plate vault 100 in an open position, comprising base portion 102, movable portion 104, vault 106 comprising storage compartment 108 and cover plate 110, user interface 112, and battery 114.

Base portion 102 is sized and shaped slightly larger than a standard vehicle license plate and mounted to a vehicle bumper (or to a license plate mounting plate affixed to a vehicle bumper) in place of where a license plate typically resides. Base portion 102 is mounted to a vehicle bumper, typically via bolts that are passed through holes 116 located along a top portion of base portion 102 to coincide with existing mounting retainers found on the bumper (or a license plate holding plate) normally used to receive bolts for mounting a license plate.

Movable portion 104 is also sized and shaped in the form of a standard license plate, comprising a front side (not shown) for mounting a license plate, and a recessed back side 118. Movable portion 104, in this embodiment, is rotatably coupled to base portion 102 via two rotation devices, such as hinges, flexible material, etc., located at a bottom portion of base portion 104 and movable portion 104. In other embodiments, a single hinge could be used alternatively, and in yet still other embodiments, the hinge(s) could be located along a top portion of base portion 102 and movable portion 104, or on either the left or right sides of base portion 102 and movable portion 104. In yet still another embodiment, movable cover 104 is removably coupled to base portion 102 using no rotation devices. In this embodiment, movable cover 104 is secured to base portion 102 using one of any number of temporary fastening techniques known in the art, such as Velcro®, snaps, friction, or other means, and is detached completely from base portion 102 when accessing compartment user interface 112 and storage compartment 108.

When smart license plate vault is not in use, movable portion 104 is manually rotated about the hinges and received by base portion 102, secured to base portion 102 via one or more temporary fastening devices, such as deformable latches 120 in cooperation with receiving slots 122. Of course, any other temporary mechanical fasteners could be used in the alternative, such as Velcro, screws, bolts, clips, etc. When movable portion 104 is secured to base portion 102, the license plate is displayed in a way that meets jurisdictional license plate viewing laws, while largely concealing the presence of smart license plate vault 100.

Figure 2:
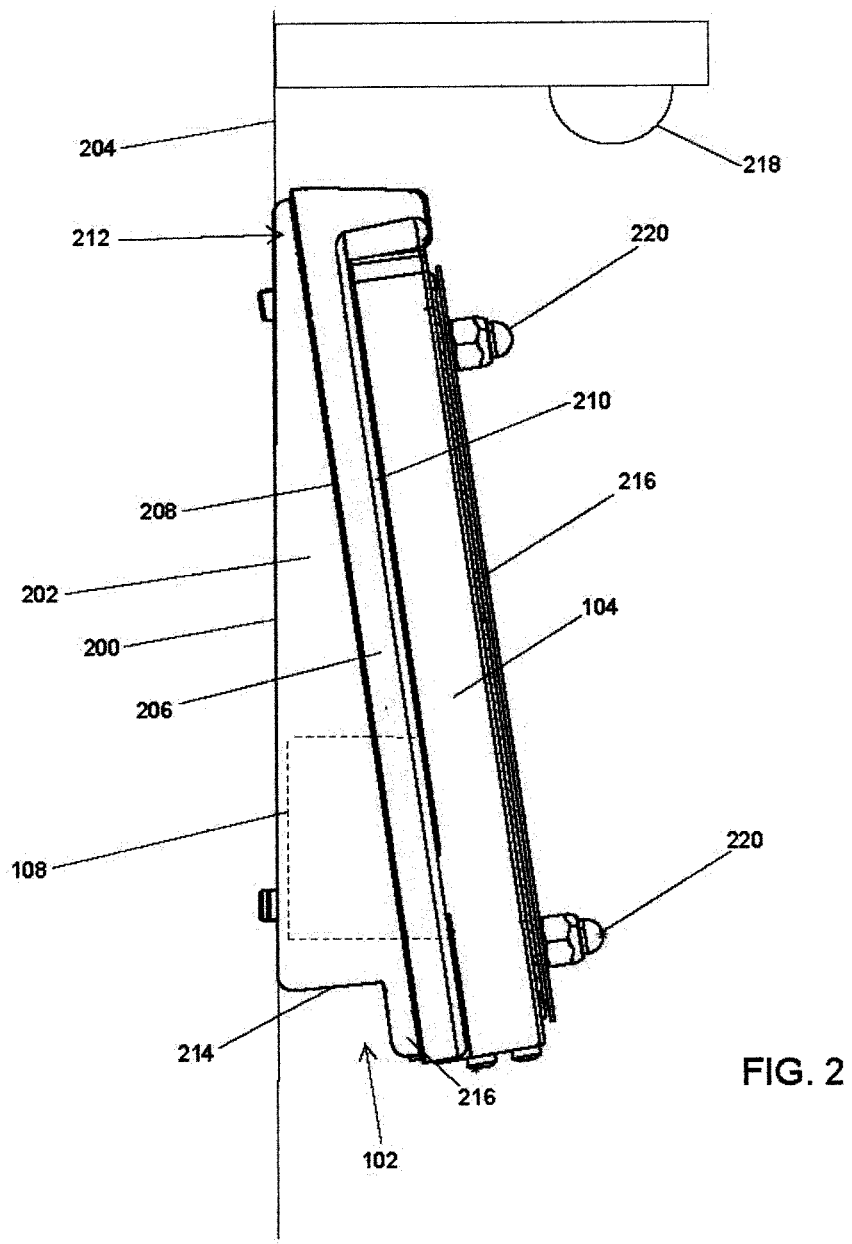
FIG. 2 is a left side, plane view of the smart license plate vault of FIG. 1, shown in a closed position, highlighting a slanted profile of the smart license plate vault.

FIG. 2 is a left side, plane view of smart license plate vault 100 in a closed position, highlighting a slanted profile of smart license plate vault 100. The base portion 102 comprises a mounting plate 200 and two, triangular sides each extending perpendicularly from mounting plate 200, one shown as triangular side 202 and a similar triangular side on the right side of mounting plate 200 (not shown in this view). Mounting plate 200 is in contact with a vehicle bumper 204 (or license plate mounting plate affixed to a vehicle bumper). Mounting plate 200 comprises two or more holes positioned to coincide with mounting fasteners found on the vehicle bumper or license plate mounting plate, and screws or bolts are typically used to secure mounting plate 200 to the vehicle bumper or license plate mounting plate via the screws or bolts.

A plate 206 is mounted to the two, triangular sides via a rear surface 208 of plate 206, plate 206 comprising a rectangular shape mounted to a hypotenuse of triangular side 202, extending past the two, triangular sides on each end. A front surface 210 of plate 206 is viewable by a user when movable portion 104 is placed into the open position. Plate 206 comprises one or more depressions for securing various components of smart license plate vault 100, such as battery 114, storage compartment 108 and user interface 112. One or more of the depressions may extend into a cavity formed by mounting plate 200, the two, triangular sides and plate 206. For example, storage compartment 108 is shown in hidden lines as extending into plate 206 and into the cavity.

The dimensions of triangular side 202 determine an angle 212 located at the top of triangular side 202. Angle 212 is formed as a result of the height of mounting plate 200 and a length of a lower extension 214 (plus an additional amount equal to a thickness of bottom protrusion 216 of triangular side 202). In the embodiment shown in FIG. 2, angle 212 is approximately 20 degrees, which causes plate 206 to also be slanted at a 20 degree angle. In other embodiments, angle 212 may be greater or less than 20 degrees.

The slanted inclination of plate 206 provides at least two, unique attributes to smart license plate vault 100. First, it allows a vehicle license plate light 218 mounted above smart license plate vault 100 to illuminate a viewable plane of the vehicle license plate 216, i.e., the alpha-numeric sequence of the license plate. License plate 216 is affixed to movable portion 104 via two or more fasteners 220, as shown. License plate 216 is also slanted at angle 212 degrees as movable portion 104 is also slanted at the same angle as angle 212 when movable portion 104 is secured against base portion 102. This arrangement allows a top portion of license plate 216 to be close to vehicle bumper 204, thus allowing vehicle license plate light 218 to illuminate the entire surface of license plate 216.

The other advantage of the slanted design of smart license plate vault 100 is that it allows a space for things such as battery 114, storage compartment 108 and user interface 112 to be flush-mounted with front surface 210 of plate 206.

Referring back to FIG. 1, a user may approach a vehicle having smart license plate vault 100 already installed, for example, on a rear bumper of the vehicle, releasing movable portion 104 from base portion 102 by, in this embodiment, releasing tabs 120 that are held by slots 122, rotating movable portion 104 downwards to a position as shown in FIG. 1 to expose plate 206, battery 114, vault 106, user interface 112, and power port 124. The user may then unlock vault 106 using a predetermined code entered into user interface 112 which, in this embodiment, comprises a keypad. In other embodiments, another type of user interface could be used, such as a microphone to detect a predetermined code word uttered by the user, a fingerprint scanner, a retina scanner, a camera, or some other device to accept some form of authorization input from a user. In these other examples, the authorized input may comprise a code word or phrase, a fingerprint of the user or another user(s) authorized to operate vault 106, the user or other authorized user's retina, a face of the user or other authorized user(s), or a bar code or QR code in the case of a camera, etc.

When the user enters the correct code, or otherwise provides predetermined user input to unlock vault 106, tabs 124 are released as one or more mechanical locking mechanisms 126, such as a movable bolt, latch, cam, or other physical obstruction, are retracted by an electric motor (not shown), allowing cover plate 110 to open. Other well-known mechanical or electro-mechanical locking devices could be used in the alternative. The user may then place one or more small objects, such as a vehicle key, vehicle FOB, home key, cell phone, or other objections into storage compartment 108, then close and lock cover plate 110, typically by entering the predetermined code or other user input via user interface 112, or by an mechanical relationship between tabs 124 and mechanical locking mechanisms 126, such as a the structure of tabs 124 constructed of a semi-bendable material that deforms tabs 124 against mechanical locking mechanisms 126 as a slanted portion of tabs 124 operate against mechanical locking mechanisms 126, and then clearing the slanted portion, locking a flat portion of tabs 124 against the mechanical locking mechanisms 126.

In another embodiment, the user may use a smart phone or some other personal communication device, such as a smart watch or other wearable device, to unlock and lock vault 106. In this embodiment, the personal communication device may execute a software application or "app" that provides the user with locking and unlocking capabilities, as well as other use functions, such as remotely providing a location of the vehicle, notifications when particular events occur in association with the vehicle, such as when a sound is detected near the vehicle, when the vehicle experiences a shock, vibration, acceleration or deceleration indicative of a break-in or collision of the vehicle, provide temperature readings of the ambient air near the vehicle, etc. The personal communication device may be wirelessly coupled with smart license plate vault 100 using either wide-area communication technology when the user is remotely located from the vehicle (such as over satellite or cellular data networks), local-area communication techniques when the user is proximate to the vehicle (such as using Bluetooth®, BLE, NFC, or some other direct wireless communication technology), or both.

After a key, FOB or other object is secured within vault 106, the user generally closes movable portion 104 against base portion 102, holding license plate 216 is a slanted position relative to the vehicle.

The user may then provide the predetermined code to a second user, for example a delivery driver, for later delivery of a package or other items to the vehicle when the vehicle is unattended by the user, for the second user to rent the user's vehicle, for unattended vehicle roadside repair, or for some other purpose. The second user could, alternatively, comprises someone who will be renting the vehicle from the user, a roadside assistance employee who may deliver fuel, fix a flat tire, change a vehicle battery, or some other person who may require access to the vehicle when the vehicle is unattended by the user. The second user unlocks vault 106 using the predetermined code provided by the user, then uses the key, FOB or other object to utilize the vehicle for a particular purpose authorized by the user. Other features of various embodiments will be described later here.

Figure 3:
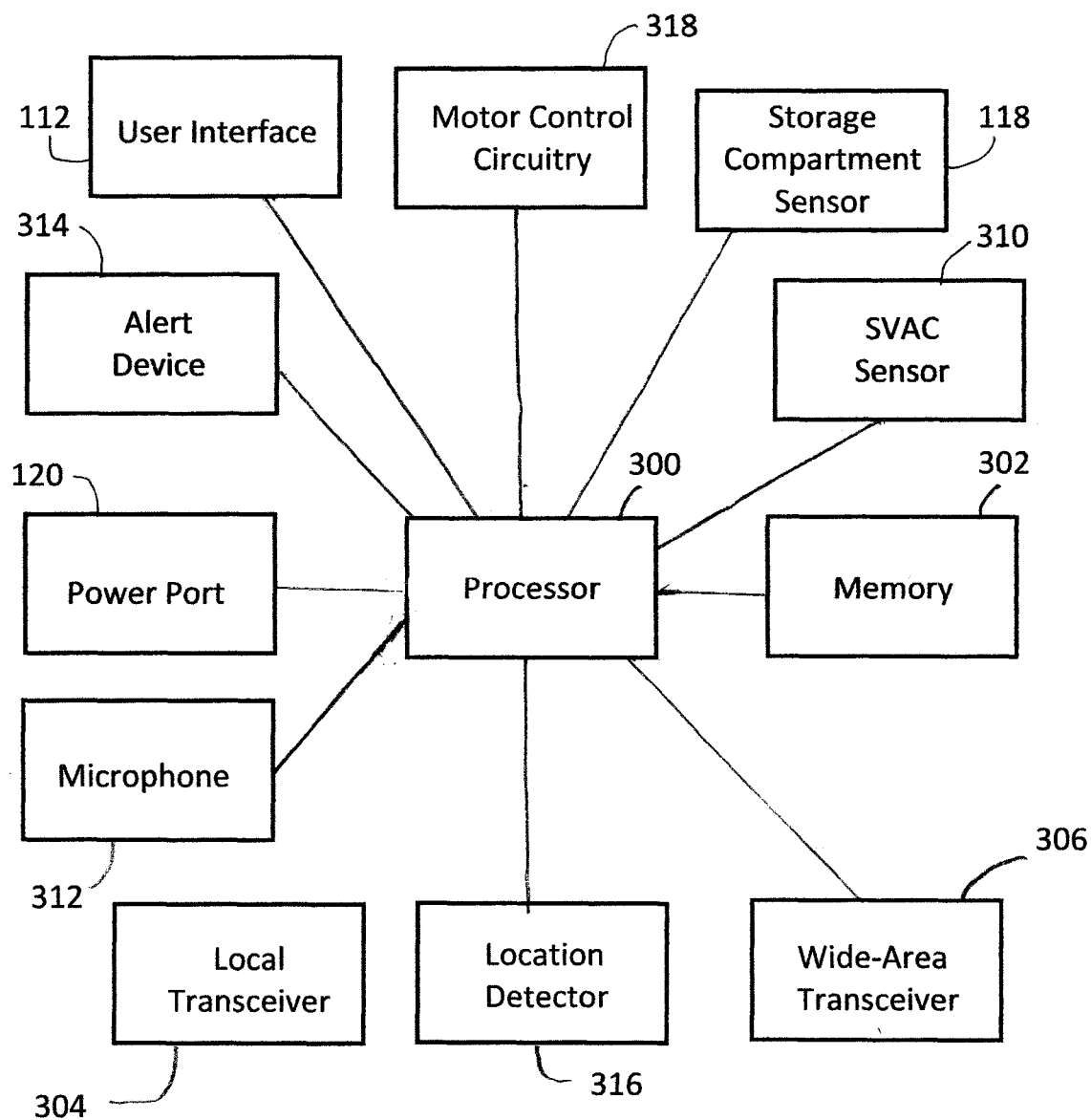
FIG. 3 is a functional block diagram of one embodiment of the smart license plate vault as shown in FIGS. 1 and 2.

FIG. 3 is a functional block diagram of one embodiment of smart license plate vault 100, comprising processor 300, memory 302, local transceiver 304, wide-area transceiver 306, user interface 112, storage compartment sensor 119, shock, vibration, acceleration, and/or compass heading (SVACA) sensor 310, microphone 312, alert device 314, power port 120, location detector 316 and motor control circuitry 318. It should be understood that not all of the functional blocks shown in FIG. 3 are required for operation of smart license plate vault 100 (for example, in some embodiments, SVAC 310 and vehicle bus interface 316 are not used), that the functional blocks may be connected to one another in a variety of ways, and that not all functional blocks necessary for operation of smart license plate vault 100 are shown (such as battery 114, data busses, or other well-known technology), for purposes of clarity.

Processor 300 is configured to provide general operation of smart license plate vault 100 by executing processor-executable instructions stored in memory 302, for example, executable code. Processor 300 typically comprises one or more general purpose processors, such as an ADuC7024 analog microcontroller manufactured by Analog Devices, Inc. of Norwood Mass., although any one of a variety of microprocessors, microcomputers, and/or microcontrollers may be used alternatively, selected on the basis of size, power consumption and cost, among other factors.

Memory 302 comprises one or more information storage devices, such as RAM, ROM, EEPROM, flash memory, or virtually any other type of electronic, optical, or mechanical memory device. Memory 302 is used to store the processor-executable instructions for operation of smart license plate vault 100 as well as any information used by processor 300, such as sound/shock/vibration thresholds, identification information (i.e., of a vehicle to which smart license plate vault 100 is attached or a serial number or other identification information of smart license plate vault 100), authorization information (such as a predetermined code, code word, QR code, barcode, digital image, etc.), status information (such as "vault door open/closed", movable portion 104 open/closed, vehicle moving/not moving, sound recordings captured via microphone 316, photographs, video or other sensor data captured by storage compartment sensor 310, and dates/times associated with each of the aforementioned information that may be stored in memory 302. In some embodiments, at least a portion of memory 302 is incorporated into processor 300.

User interface 112 is used to allow a user to operate smart license plate vault 100, used to provide authorization information to processor 300 and, in some embodiments, provide feedback to a user, for example, that authorization information provided to user interface 112 was successfully, or unsuccessfully, processed. In one embodiment, user interface 112 may comprises a keypad comprising a number of pushbuttons or, in another embodiment, a touchscreen displaying a variety of symbols, such as numbers and/or letters. In other embodiments, user interface 112 could comprise one or more pushbuttons, switches, knobs, or some other mechanical device. In some embodiments, user interface 112 may comprise a microphone for receiving a predetermined code word verbally and converting the predetermined code word into an electronic signal for processing by processor 300. In yet still other embodiments, user interface 112 could comprise a digital camera for capturing digital images of users' retina, face, a QR code, a barcode, or some other visual authorization to operate smart license plate vault 100. In any of the above cases, processor 300 compares input received from user interface 112 and compares the input to one or more access codes or, more generally, access criteria stored in memory 302 to determine if a match is found. If a match is found, processor 300 causes motor control circuitry 318 to move mechanical locking mechanism 126 to unlock, or lock, vault 106.

User interface 112 could additionally comprise a speaker to provide audio feedback in response to entries to user interface 112, and/or an electronic display to provide visual feedback, such as a touchscreen, one or more LEDs, etc. A speaker could also be used to provide audio instructions to an authorized third party accessing smart license plate vault 100, such as pre-recorded instructions stored in memory 302 on how to operate the vehicle, where a jack or wheel lock may be located, fueling instructions, package delivery instructions, etc. A speaker may also be used to provide real-time communications between a user and an authorized third party as the authorized third party operates smart license plate vault 100. For example, smart license plate vault 100 could send an alert to a user that vault 106 has been opened. In response, the user may speak to the authorized third party using the user's client device (i.e., smart phone), where the user's voice is provided to the authorized third party via the speaker. Two-way voice communications may also be possible, using a microphone on smart license plate vault 100. In yet still another embodiment, no user interface is used. In this embodiment, operation of smart license plate vault 100 is accomplished using a computer, smartphone, or some other electronic communication device.

Local transceiver 304 comprises circuitry necessary to transmit and receive wireless signals directly with a user device, such as a smartphone, when a user is within range of local transceiver 304, for example, when a user approaches smart license plate vault 100 to store or retrieve on object from vault 106. Local transceiver 304 comprises circuitry in accordance with one of any number of well-known local communication technologies, such as Bluetooth®, BLE, Wi-Fi, Zigbee, Z-Wave, X-10, infra-red, ultrasonic and any other local communication technology suitable for use in a battery-powered device.

Wide area transceiver 306 comprises circuitry necessary to transmit and receive wireless signals with a user device, such as a computer, smartphone or other electronic communication device, when a user is remotely located from smart license plate vault 100. Wide area transceiver 306 comprises circuitry in accordance with one of any number of well-known wide area communication technologies, such as one of any number of cellular data technologies (such as 4G LTE, UMTS, etc.) or any other wide area communication technology suitable for use in a battery-powered device.

Storage compartment sensor 119 is used to detect the presence of an objection object inside storage compartment 108 so that one or more users know when an object is presently being stored within storage compartment 108. In some embodiments, storage compartment sensor 119 may additionally determine one or more physical properties, parameters, attributes, and/or characteristics of one or more objects stored inside storage compartment 108. In one embodiment, storage compartment sensor 119 comprises a digital camera and a light source (such as an LED) to record one or more digital images of storage compartment 108, including any object that may be stored therein. In other embodiments, storage compartment sensor 119 comprises an ultrasonic or infra-red detector, a capacitance or inductance detector to detect changes in an RF field emitted by such a capacitance or inductance detector when an object is placed into storage compartment 108. In one embodiment using a digital camera and a light source, processor 300 causes the light source to illuminate, cause the digital camera to capture a digital image of storage compartment 108, then extinguish the light source after processor 300 determines that cover plate 110 has been closed, i.e., immediately after cover plate 110 has been closed or a predetermined time period after such closure has been detected. Such detection can be accomplished by processor 300 coupled to a simple switch (not shown) incorporated into vault 106 that activates when cover 100 is closed against storage compartment 108. In another embodiment, processor 300 causes storage compartment sensor 119 to record information (such as a digital image, capacitance or inductance readings, etc.) at predetermined time intervals, such as once every 30 minutes. In yet still another embodiment, processor 300 causes storage compartment sensor 119 to record information upon the occurrence of a predetermined event, such as vehicle movement (as detected by a shock, vibration, accelerometer and/or compass described later herein), or upon opening of cover plate 110 in order to determine what was inside storage compartment 108 immediately before an object has been removed from storage compartment 108. In yet still further embodiments, storage compartment sensor 119 records information upon determining a change that has occurred with respect to storage compartment 108, such detecting when an object has been inserted or removed from storage compartment 108. In this embodiment, storage compartment sensor 119 may comprise a simple passive infrared (PIR) device (i.e., a motion sensor).

Processor 300 may perform one or more actions after an event has been detected, as described above, i.e., that an object has been placed in or removed from storage compartment 108, a shock, vibration, or acceleration of the vehicle, a change in compass heading of the vehicle. For example, processor 300 may transmit certain information to one or more remote locations when an event is detected, such as to a vehicle owner, to a vehicle renter, delivery person, or other interested, authorized persons. Memory 302 may store contact information of one or more of these persons, and processor 300 may generate and transmit, via wide-area transceiver 306 an SMS, email or other electronic communication when an event occurs, comprising information such as an identification of the vehicle, a location of the vehicle (as determined by a vehicle location detector 316, such as a GPS, GLONASS, or other satellite-based detector, and/or wide area 306 when assisted GPS is used), a status of the vehicle (i.e., an indication as to whether the vehicle is moving or stationary as determined using SVACA sensor(s) 310, an indication as to whether the vehicle engine is on or not (as determined by processing audio information provided by microphone 312), a status of storage compartment 108 (i.e., object present or not present, a digital photograph, capacitance value, inductance value, etc.), an identification of a person who last opened cover plate 110 (as determined by a camera (not shown) mounted to plate 206 for photographing a user as a user operates smart license plate vault 100, or some other information.

SVAC sensor 310 comprises a shock, vibration, acceleration or compass orientation sensor(s) that provide physical information pertaining to the vehicle or the vehicle's surroundings. Smart license plate vault 100 may comprise all or a subset of each of these sensors, and further sensors are contemplated, such as a temperature sensor to detect an ambient temperature where the vehicle is located. A shock sensor can be used to detect events such as vehicle break ins, accidents, vehicle door entries and exits. A vibration sensor can detect whether the vehicle is moving or not or whether a vehicle engine is running or not. An accelerometer may be used to detect movement of the vehicle, or how fast a vehicle is being driven, based on the acceleration measured around turns or changes in street or highway topography. A digital compass may be used to determine a direction that the vehicle is pointed, or travelling. In any of the above examples, one or more thresholds may be stored in memory 302 so that when a measurement by any of the sensors exceeds, or falls below, one or more of the thresholds, processor 300 can take one or more predetermined actions, such as alert users near the vehicle by causing alert device 314 to activate and/or to transmit one or more alerts via wide area transceiver 306.

Microphone 312 comprises a small, inexpensive sound transducer that converts sound wave energy into electronic signals for processing by processor 300 in order to detect events that may occur in proximity to the vehicle and/or to smart license plate vault 100. For example, microphone 312 may be used to detect the vehicle's engine noise when the vehicle's engine is running, to detect a sound of a vehicle horn blowing, voice commands to smart license plate vault 100, code words to lock and unlock vault 106, etc. Microphone 312 typically comprises a piezo-type microphone.

Alert device 314 provides for alerting persons nearby smart license plate vault 100, for example that a vehicle break-in is occurring, to find a particular vehicle in an area where numerous vehicles are parked, such as in a vehicle leasing lot, a shopping mall parking lot, etc. Alert device 314 may comprise one or more lights, such as LEDs, positioned on or around smart license plate vault 100 and/or a speaker (not shown) for illuminating smart license plate vault 100, license plate 216 or sounding an alert. Alert device 314 is activated by processor 300 when processor 300 determines that certain events have occurred, such as when processor 300 determines that a shock, vibration, acceleration, change in compass heading, vehicle engine starting, etc. has occurred. Processor 300 may also cause alert device to activate when processor 300 receives a wireless command, either via local area transceiver 304 or wide are transceiver 306, to activate alert device 314. Such a command may be transmitted by a user via the user's personal communication device, i.e., smart phone, for finding the user's vehicle in a crowded parking lot, or in commercial applications in order to find a particular rental vehicle, or for a car dealer to find a particular make and model in a large dealer parking lot, to show to a customer.

Power port 120 is located on plate 206 and provides a connection to an external power source to provide power to certain components of smart license plate vault 100 when battery 114 is dead, such as to processor 300, memory 302, motor control circuitry and user interface 112. Battery 114 is located in depression 128 formed in plate 206, as shown in FIG. 1, having a tab 130 extending on one side (on the right side in this embodiment, as shown in FIG. 1) that, in one embodiment, interlocks with a catch 132 within plate 206 to secure battery 114 inside depression 128. In another embodiment, tab 130 comprises one or more through holes for mounting screws or bolts to pass into plate 206. In either case, when cover plate 110 is in the closed position, at least tab 130 is hidden behind cover plate 110, preventing battery 114 from being removed (in other embodiments, all or a portion of battery 114 itself may be covered by cover plate 110 when cover plate 110 is in a locked position in an embodiment where cover plate 110 is greater in width than what is shown in FIG. 1). If battery 114 does not have sufficient power to energize the components of smart license plate vault 100, battery 114 cannot be replaced unless and until vault 106 is opened. However, a user can connect an external power source to power port 120 and energize the components necessary to open vault 106 and, thereby, allow battery 114 to be replaced. In one embodiment, battery 114 is not charged when an external power source is connected to power port 120. This allows a smaller external battery to open vault 106, because the external power source does not have to use its charge to additionally bring the battery up to a certain charge level. In another embodiment, battery 114 is charged when an external power source is connected to power port 120.

Motor control circuitry 318 is used to control an electric motor inside or behind plate 206, to lock and unlock vault 106, i.e., moving mechanical locking mechanisms 126 or otherwise freeing cover plate 110 from storage compartment 108. Motor control circuitry is well-known in the art.

In one embodiment of using smart license plate vault 100, limited access to storage compartment 108 is provided to one or more authorized users, such as a package deliveryman, vehicle renter, vehicle repairman, etc. Access may be limited by time, location, or both. In this embodiment, a user may provide authorization for one or more other users by entering information to smart license plate vault 100 via user interface 112 or via an app on a computer, smart phone, etc. For example, an access code may be entered, followed by a time, or a time period, at which authorization expires. The access code may comprise an alpha-numeric sequence, a bar code, a QR code, an image, a code word, etc. The access code may then be provided to an authorized user. After the time is reached, or time period expires, the authorized user may no longer be able to access vault 106, even by using the access code provided by the user. Similarly, access may only be provided when processor 300 determines that the vehicle is within a boundary set by the user, as reported by location detector 316. In one embodiment, an access code is not used. In this embodiment, the user may set a time period during which the vault 106 is accessible without an access code, set a location where vault 106 is accessible without an access code, or both in a case where the vehicle may be in a safe location or otherwise when it is difficult or impossible to provide an access code to a second user.

In one embodiment, a user may set an access time or "time window" is defines as a time period in which a user may use an object secured inside vault 106. Such an application may find use in delivery services, where it is expected that a vehicle key would be used for only a short time in order to place a package or other delivery item into the vehicle. In this embodiment, a time window is defined, lasting anywhere from a minute to longer periods, such as a day or a week, using either user interface 112 or an app on the user's computer or smart phone. An access code is provided to an authorized third party, and when vault 106 is opened, processor 300 detects the opening of cover plate 110, and begins to track the elapsed time from when cover plate 110 was opened. In the case of a vehicle key, if the key is not returned to vault 106 by the time the time window expires (as determined by processor 300, for example, by causing storage compartment sensor 119 to take a reading of storage compartment 108 (i.e., a photographic, capacitive, inductive, ultrasonic or infra-red reading) when the time window expires, and determine, based on the reading, that the key has not been replaced), processor 300 causes wide area transceiver 306 to transmit an alert, indicating that the key was not returned to the vault within the time window. In another embodiment, when the time window expires, processor 300 may take a reading of storage compartment 108 and transmit the reading to the user and allow the user to interpret the reading to know if the key has been returned to vault 106 in time. In one embodiment, processor 300 may determine that the key was placed back inside storage compartment 108 within the time window. In this case, processor 300 may transmit a message to the user indicating that the key was replaced within the time window, so that the user knows that the task authorized by the user has been completed.

Figure 4:
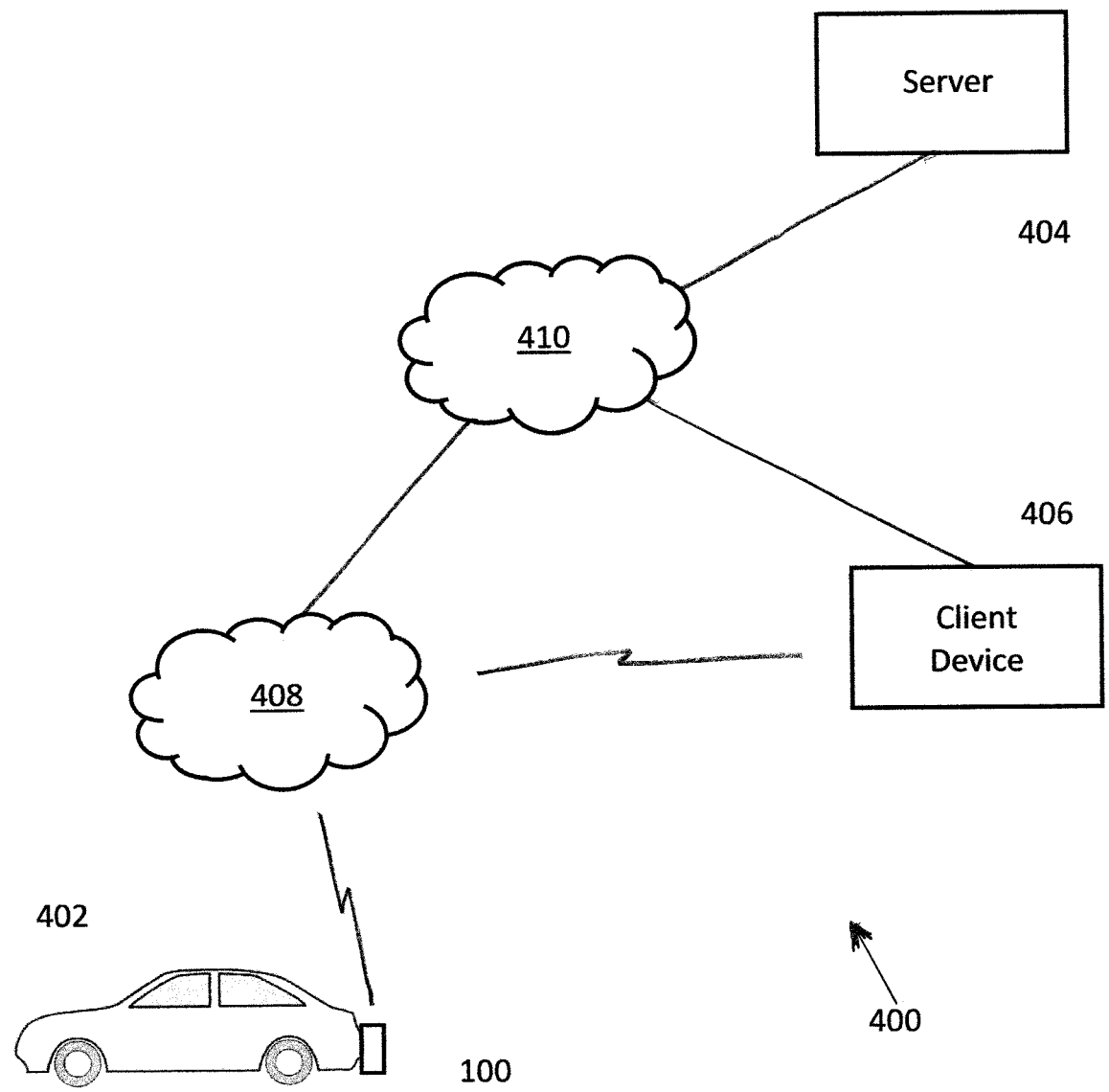
FIG. 4 is a block diagram showing one embodiment of a system in which the smart license plate vault of FIGS. 1, 2 and 3 may be used.

FIG. 4 is a block diagram showing one embodiment of a system 400 in which smart license plate vault 100 may be used. FIG. 4 shows a vehicle 402 comprising smart license plate vault 100, a server 404 and a client device 406. Smart license plate vault 100 is wirelessly coupled to cellular data network 408, which is in turn coupled to wide area network 410, such as the Internet. Server 404 and client device 406 are coupled via wide area network 410.

Smart license plate vault 100 may send alerts and other signals to client device 406 via server 404, where server 404 may process the alerts and signals from smart license plate vault 100 in order to determine certain events that may have occurred in proximity to, or to, vehicle 402, to determine the contents of storage compartment 108, to create and store historical information pertaining to vehicle 402 smart license plate vault 100 and/or and to contact one or more persons when certain events occur in proximity to, or to, vehicle 402.

An owner of vehicle 402 may install smart license plate vault 100 onto vehicle 402 and then create an account with server 404, providing such information as the owner's name, address, contact information, make and model of vehicle 402, identification information of smart license plate vault 100, billing information, etc. In response, server 402 creates an account associated with owner.

Server 404 may then receive alerts and other messages from smart license plate vault 100 and associate the alerts and messages to the owner's account, based on identification information sent by smart license plate vault 100 in each alert or message.

In one embodiment, server 404 may be used to determine an event that has occurred near, or to, vehicle 402 as server 404 receives certain information from smart license plate vault 100 after smart license plate vault 100 determines that an event may have occurred. Smart license plate vault 100 may send server 404 a message when one or more thresholds have been exceeded relating to a sound that occurred in proximity to vehicle 402, a shock, a vibration, an acceleration, or a compass heading experienced by vehicle 404, etc. When one or more thresholds have been exceeded, processor 300 causes wide area transceiver 306 to transmit a message with information pertaining to one or more of the conditions sensed by smart license plate vault 100. For example, smart license plate vault 100 may send a sound clip, a digital photograph or video, a shock, vibration, accelerometer, or a compass reading or series of readings, a voice command, etc. Server 404 processes such information to determine if the owner, or some other authorized persons, should be notified, in the case where server 404 determines that a predetermined event has occurred, such as a vehicle break-in, vehicle theft, accident, movement, non-movement, etc. based on the information provided by smart license plate vault 100 and based on rules that may be defined by the owner. For example, the owner may want to be notified by server 404 only when vehicle 402 experiences an acceleration greater than 30 feet-per-second squared and only between the hours of 10 pm until 5 am.

Server 404 may be configured to interpret words spoken by a user in proximity to smart license plate vault 100, or to evaluate access information provided by a user in proximity to smart license plate vault 100. For example, server 404 may be provisioned with word detection software that can determine when a code word is spoken by a user trying to access storage compartment 108. When server 404 determines that the proper code word has been spoken, server 404 provides a command to smart license plate vault 100 for smart license plate vault 100 to lock or unlock vault 106, as the case may be. Server 404 may evaluate other access information, such as a digital image of the user taken by the user's camera and provided to server 404 via an app on the user's client device, i.e., smart phone, a QR code, a bar code, a digital photograph of a portion of the user, such as a tattoo, retina, or other identifying indicia. In this case, server 404 compares the information to expected information stored in the server's database, previously provided by the owner of vehicle 402, to determine whether a match is found. If so, server 404 provides a command to smart license plate vault 100 for smart license plate vault 100 to lock or unlock vault 106.

Server 404 may further be configured to determine an object in storage compartment 108, using software specially configured to determine object types. Typically, such software utilizes a database of common objects small enough to fit within storage compartment 108. Upon receipt of a digital image or video from smart license plate vault 100, either upon the occurrence of a predetermined event occurring at or near the vehicle, or in response to a command provided by client device 402 to smart license plate vault 100, server 404 determines whether the digital image or video matches an object found in the database. If so, server 404 may then provide an alert to client device 406, indicating that a particular object is within storage compartment 108.

Server 404 may maintain a historical accounting of information pertaining to smart license plate vault 100, such as dates and times that vault 106 was opened and/or closed, event activity and associated times, dates and locations that each event occurred, messages sent to or received from smart license plate vault 100, etc. Such information may be provided to client device 402 upon request by the user.

In the foregoing description, certain aspects and embodiments of the invention may be applied independently and some of them may be applied in combination as would be apparent to those of skill in the art. For the purposes of explanation, specific details are set forth in order to provide a thorough understanding of embodiments of the invention.

The foregoing description provides exemplary embodiments only, and is not intended to limit the scope, applicability, or configuration of the disclosure. Rather, the forgoing description of the exemplary embodiments will provide those skilled in the art with an enabling description for implementing an exemplary embodiment. It should be understood that various changes may be made in the function and arrangement of elements without departing from the spirit and scope of the embodiments as set forth in the appended claims.

Although specific details are given to provide a thorough understanding of at least one embodiment, it will be understood by one of ordinary skill in the art that some of the embodiments may be practiced without disclosure of these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a method, a process or an algorithm performed by a processor, which may be depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure.

The terms "computer-readable medium", "memory", "storage medium", and "data storage device" includes, but is not limited to, portable or non-portable electronic data storage devices, optical storage devices, and various other mediums capable of storing, containing, or carrying processor-executable instruction(s) and/or data. These terms each may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, RAM, ROM, flash memory, solid state disk drives (SSD), etc. A computer-readable medium or the like may have stored thereon code and/or processor-executable instructions that cause a processor or a device in whole to perform a method, algorithm, procedure, function, subprogram, program, routine, subroutine, or any combination of instructions, data structures, or program statements.

Furthermore, embodiments may be implemented by hardware, software, firmware, middleware, microcode, hardware description languages, or any combination thereof. When implemented in software, firmware, middleware or microcode, the program code, i.e., "processor-executable instructions", or code symbols to perform the necessary tasks (e.g., a computer-program product) may be stored in a processor-readable or machine-readable medium. One or more processors may perform the necessary tasks.

We claim:

1. A vehicle vault, comprising:
   a base portion sized and shaped as a vehicle license plate holder for installation onto a vehicle bumper, the base portion comprising:
      a vault for storing small objects, comprising a storage compartment and a removable cover for providing access to the storage compartment; and
      an electronic locking mechanism for locking and unlocking the vault;
   a movable portion rotatably coupled to an edge of the base portion, comprising means to secure a vehicle license plate;
   a vault cover plate sensor for detecting when the vault cover plate has been placed into a closed position;
   a storage compartment sensor for recording information regarding an interior of the storage compartment in response to the vault cover plate sensor detecting that the vault cover plate has been placed into the closed position; and
   a transmitter for wirelessly transmitting the recorded information to a remote location.

2. The vehicle vault of claim 1, further comprising:
   a battery mounted into a depression formed into a face of the base portion and electronically coupled to the electronic locking mechanism, the battery comprising a tab that extends past an edge of the battery;
   wherein the removable cover is sized and shaped to shield the cover and the tab thereby preventing the battery from being removed when the removable cover is closed against the storage compartment.

3. The vehicle vault of claim 1, wherein the movable portion comprises a slanted surface that secures a vehicle license plate in place and at an angle to a vehicle license plate light such that a viewable plane of the vehicle license plate is illuminated when the vehicle license plate light is illuminated.

4. The vehicle vault of claim 3, wherein the base portion comprises:
   a mounting plate sized and shaped substantially in the form of a license plate for secure attachment to a vehicle bumper or license plate holder; and
   two, triangular side portions each extending perpendicularly from left and right mounting plate ends, respectively, a hypotenuse of each triangular side portion and the mounting plate forming the angle.

5. The vehicle vault of claim 1, further comprising:
   a charging port for providing power to the electronic locking device when an external power source is coupled to the charging port.

6. The vehicle vault of claim 5, further comprising:
   a battery coupled to the electronic locking device;
   wherein the battery is not charged when the external power source is coupled to the charging port.

7. The vehicle vault of claim 1, wherein:
   the storage compartment sensor comprises a sensor for determining whether an object is present inside the storage compartment; and
   the transmitter is used for wirelessly transmitting a result of the determination to the remote location.

8. The vehicle vault of claim 1, further comprising:
   a wireless receiver for receiving a command from a client device for the storage compartment sensor to record the information regarding the interior of the storage compartment.

9. The vehicle vault of claim 1, wherein:
   the storage compartment sensor comprises a sensor for determining whether a vehicle key is present inside the storage compartment; and
   the transmitter is used for wirelessly transmitting a result of the determination to the remote location.

10. The vehicle vault of claim 1, wherein:
    the storage compartment sensor comprises a sensor for determining one or more physical properties, parameters, attributes, and/or characteristics of one or more objects stored inside storage compartment; and
    the transmitter is used for wirelessly transmitting a result of the determination to the remote location.

11. The vehicle vault of claim 1, further comprising:
    a microphone for converting sounds wave energy into electronic signals;
    a processor coupled to the microphone, the processor for determining when a vehicle engine is running based on the electronic signals; and
    a transmitter for transmitting an alert when the processor determines that the vehicle engine is running.

12. The vehicle vault of claim 1, further comprising:
    a shock sensor for detecting physical disturbances to the vehicle and generating electronic shock signals in response thereto;
    a processor coupled to the shock sensor, for determining when a shock event has occurred to the vehicle based on the electronic shock signals provided by the shock sensor; and
    a transmitter for transmitting an alert when the processor determines that the shock event has occurred.

13. The vehicle vault of claim 1, further comprising:
    a vibration sensor for detecting physical disturbances to the vehicle and generating electronic vibration signals in response thereto;
    a processor coupled to the vibration sensor, for determining when the vehicle is in motion based on the electronic vibration signals provided by the vibration sensor; and
    a transmitter for transmitting an alert when the processor determines that the vehicle is in motion.

14. The vehicle vault of claim 1, further comprising:
    a light source for illuminating at least the license plate;
    a wireless receiver for receiving a signal from a client device for the light source to illuminate; and a processor coupled to the light source and the wireless receiver, for causing the light source to illuminate in response to receiving the signal.

15. The vehicle vault of claim 1, wherein the electronic locking assembly comprises:
   a keypad formed into the base portion;
   an electronic motor;
   a movable mechanical locking mechanism bolt coupled to the electronic motor;
   a memory for storing processor-executable instructions and an access code; and
   a processor coupled to the keypad, the electronic motor and the memory, for executing the processor-executable instructions that causes the processor to:
      receive a code from the keypad;
      determine that the code matches the access code stored in the memory; and
      in response to determining that the code matches the access code stored in the memory, cause the electronic motor to move the movable mechanical locking mechanism into an unlocked position.

16. The vehicle vault of claim 15, further comprising:
   a transmitter coupled to the processor;
   wherein the processor-executable instructions comprise further instructions that causes the processor to:
   determine when the vault has been opened;
   determine that the vault has been opened for a time greater than a predetermined permitted access time stored in the memory; and
   cause the transmitter to transmit an alert when the vault has been opened more than the predetermined permitted access time.

17. The vehicle vault of claim 16, further comprising:
   a wireless receiver;
   wherein the processor-executable instructions further comprise instructions that further cause the processor to:
   receive the predetermined permitted access time from the wireless receiver; and
   store the predetermined permitted access time in the memory.

18. The vehicle vault of claim 1, wherein the storage compartment sensor comprises at least one of a digital camera, an ultrasonic detector, an infra-red detector, a capacitance detector, or an inductance detector.

19. A vehicle vault, comprising:
   a base portion sized and shaped as a vehicle license plate holder for installation onto a vehicle bumper, the base portion comprising:
      a vault for storing small objects, comprising a storage compartment and a removable cover for providing access to the storage compartment; and
      an electronic locking mechanism for locking and unlocking the vault;
   a movable portion rotatably coupled to an edge of the base portion, comprising means to secure a vehicle license plate;
   a vault cover plate sensor for detecting when the vault cover plate has been placed into a closed position;
   a digital camera for providing a first digital image of an interior of the storage compartment in response to the vault cover plate sensor detecting that the vault cover plate has been placed into the closed position; and
   a transmitter for wirelessly transmitting the first digital image to a remote location.

20. A vehicle vault, comprising:
   a base portion sized and shaped as a vehicle license plate holder for installation onto a vehicle bumper, the base portion comprising:
      a vault for storing small objects, comprising a storage compartment and a removable cover for providing access to the storage compartment; and
      an electronic locking mechanism for locking and unlocking the vault;
   a movable portion rotatably coupled to an edge of the base portion, comprising means to secure a vehicle license plate; and
   a battery mounted into a depression formed into a face of the base portion and electronically coupled to the electronic locking mechanism, the battery comprising a tab that extends past an edge of the battery;
   wherein the removable cover is sized and shaped to shield the cover and the tab thereby preventing the battery from being removed when the removable cover is closed against the storage compartment.

* * * * *